(12) United States Patent
Yoon

(10) Patent No.: US 9,946,343 B2
(45) Date of Patent: Apr. 17, 2018

(54) MOTION TRACKER WITH AN ARRAY OF DISTINCT LIGHT SOURCES

(71) Applicant: OCULUS VR, LLC, Menlo Park, CA (US)

(72) Inventor: Youngshik Yoon, Cupertino, CA (US)

(73) Assignee: OCULUS VR, LLC, Menlo Park, CA (US)

( * ) Notice: Subject to any disclaimer, the term of this patent is extended or adjusted under 35 U.S.C. 154(b) by 21 days.

(21) Appl. No.: 15/139,019

(22) Filed: Apr. 26, 2016

(65) Prior Publication Data

US 2017/0308159 A1    Oct. 26, 2017

(51) Int. Cl.
| | |
|---|---|
| *G06F 3/01* | (2006.01) |
| *G06T 19/00* | (2011.01) |
| *G06T 7/00* | (2017.01) |
| *G02B 27/00* | (2006.01) |
| *G02B 27/01* | (2006.01) |
| *G02B 27/09* | (2006.01) |

(52) U.S. Cl.
CPC ......... *G06F 3/013* (2013.01); *G02B 27/0093* (2013.01); *G02B 27/0172* (2013.01); *G02B 27/0176* (2013.01); *G02B 27/0944* (2013.01); *G02B 27/0955* (2013.01); *G06F 3/012* (2013.01); *G06T 7/004* (2013.01); *G06T 19/006* (2013.01); *G02B 2027/014* (2013.01); *G02B 2027/015* (2013.01); *G02B 2027/0138* (2013.01); *G02B 2027/0152* (2013.01); *G06T 2207/10048* (2013.01); *G06T 2207/10152* (2013.01)

(58) Field of Classification Search
CPC ..... G02B 27/01; G02B 27/0093; F41G 3/225; G06F 3/012; G06F 3/0308; G06F 3/0325
See application file for complete search history.

(56) References Cited

U.S. PATENT DOCUMENTS

| | | | |
|---|---|---|---|
| 2016/0025978 A1* | 1/2016 | Mallinson .......... | G02B 27/0172 345/8 |
| 2016/0057339 A1* | 2/2016 | Raffle ................ | G06K 9/00281 348/222.1 |

* cited by examiner

*Primary Examiner* — William Boddie
*Assistant Examiner* — Jeffrey A Parker
(74) *Attorney, Agent, or Firm* — Morgan, Lewis & Bockius LLP

(57) ABSTRACT

A head-mounted display device includes a display element with a two-dimensional array of pixels, and an enclosure at least partially enclosing the display element. The head-mounted display device also includes a plurality of light sources located on the enclosure for determining a position of the head-mounted display device. Each light source of the plurality of light sources is uniquely identifiable based at least in part on light emitted by the light source.

18 Claims, 16 Drawing Sheets

MOTION TRACKER WITH AN ARRAY OF DISTINCT LIGHT SOURCES

TECHNICAL FIELD

This relates generally to display devices, and more specifically to head-mounted display devices.

BACKGROUND

Head-mounted display devices (also called herein head-mounted displays) are gaining popularity as means for providing visual information to user. However, the size and weight of conventional head-mounted displays have limited applications of head-mounted displays.

SUMMARY

Accordingly, there is a need for head-mounted displays that are compact and light, thereby enhancing the user's virtual-reality and/or augmented reality experience. In addition, the head-mounted displays should be low power, to ensure a long battery life.

In particular, eye-tracking is important in providing virtual-reality and/or augmented reality experience, because images (or media) presented by the head-mounted displays are selected based on a position of an eye. For example, when an eye of a user rolls left, an image that corresponds to the left side of the user is displayed and when the eye rolls right, an image that corresponds to the right side of the user is displayed, thereby providing a visual feedback that mimics a real world environment. However, conventional eye trackers (also called herein eye tracking devices) are bulky, partly because conventional eye trackers require a certain distance for optics to work. Furthermore, distortions associated with conventional eye trackers lead to errors in measuring eye positions.

The above deficiencies and other problems associated with conventional head-mounted displays are reduced or eliminated by the disclosed display devices. In some embodiments, the device is a head-mounted display device. In some embodiments, the device is portable.

In accordance with some embodiments, a head-mounted display device includes a display element with a two-dimensional array of pixels, and an enclosure at least partially enclosing the display element. The head-mounted display device also includes a plurality of light sources located on the enclosure (e.g., on an external surface of the enclosure) for determining a position of the head-mounted display device. Each light source of the plurality of light sources is uniquely identifiable based at least in part on light emitted by the light source.

In accordance with some embodiments, a display device system includes the head-mounted display device, an array of optical sensors for receiving light from the plurality of light sources of the head-mounted display device; and one or more processors for determining the position of the head-mounted display device based at least in part on the received light.

In accordance with some embodiments, a method is performed at a head-mounted display device. The method includes receiving light output by a plurality of light sources located on the head-mounted display device; generating electrical signals based on the received light; and processing the electrical signals to determine a position of the head-mounted display device.

Thus, the disclosed embodiments provide compact and light display devices with increased efficiency, effectiveness, and user satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
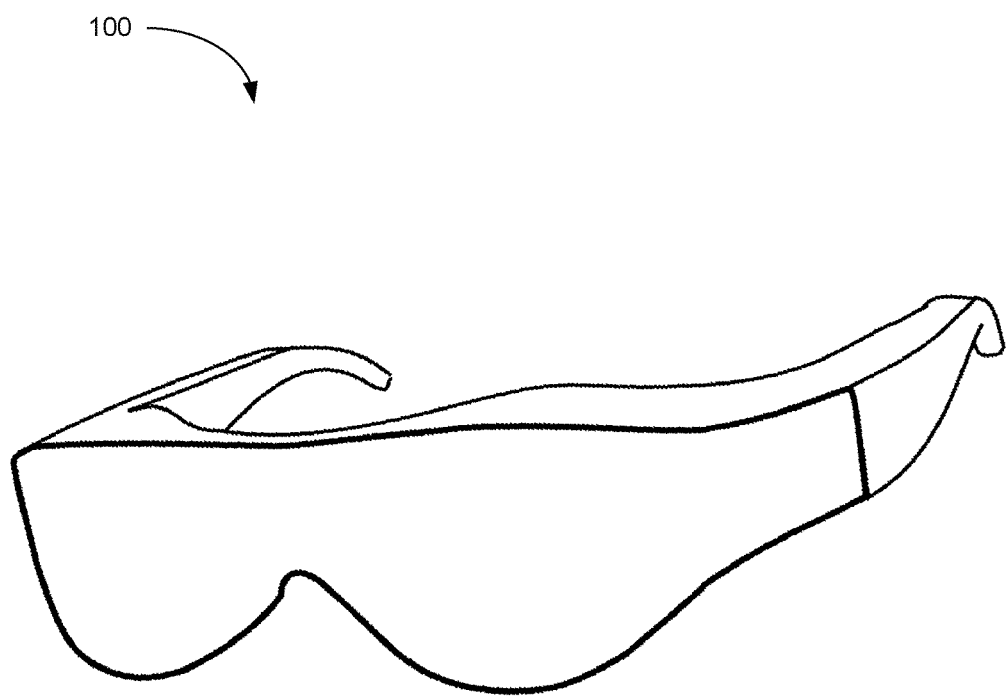
FIG. 1 is a perspective view of a display device in accordance with some embodiments.

These figures are not drawn to scale unless indicated otherwise.

DETAILED DESCRIPTION

Head-mounted displays often require a motion tracker to determine a position of such display devices. Projecting images based on the positions of a display device (e.g., projecting an image of an east-side scene when the head turns east and projecting an image of a west-side scene when the head turns east) improves the user experience with the provided virtual reality or augmented reality environment. The position of the display device needs to be determined rapidly to provide a realistic visual feedback.

The disclosed embodiments, by utilizing a plurality of light sources, provide display devices (including those that can be head-mounted) whose positions can be determined rapidly, which, in turn, improves the user experience with such devices.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first lens could be termed a second lens, and, similarly, a second lens could be termed a first lens, without departing from the scope of the various described embodiments. The first lens and the second lens are both lenses, but they are not the same lens.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
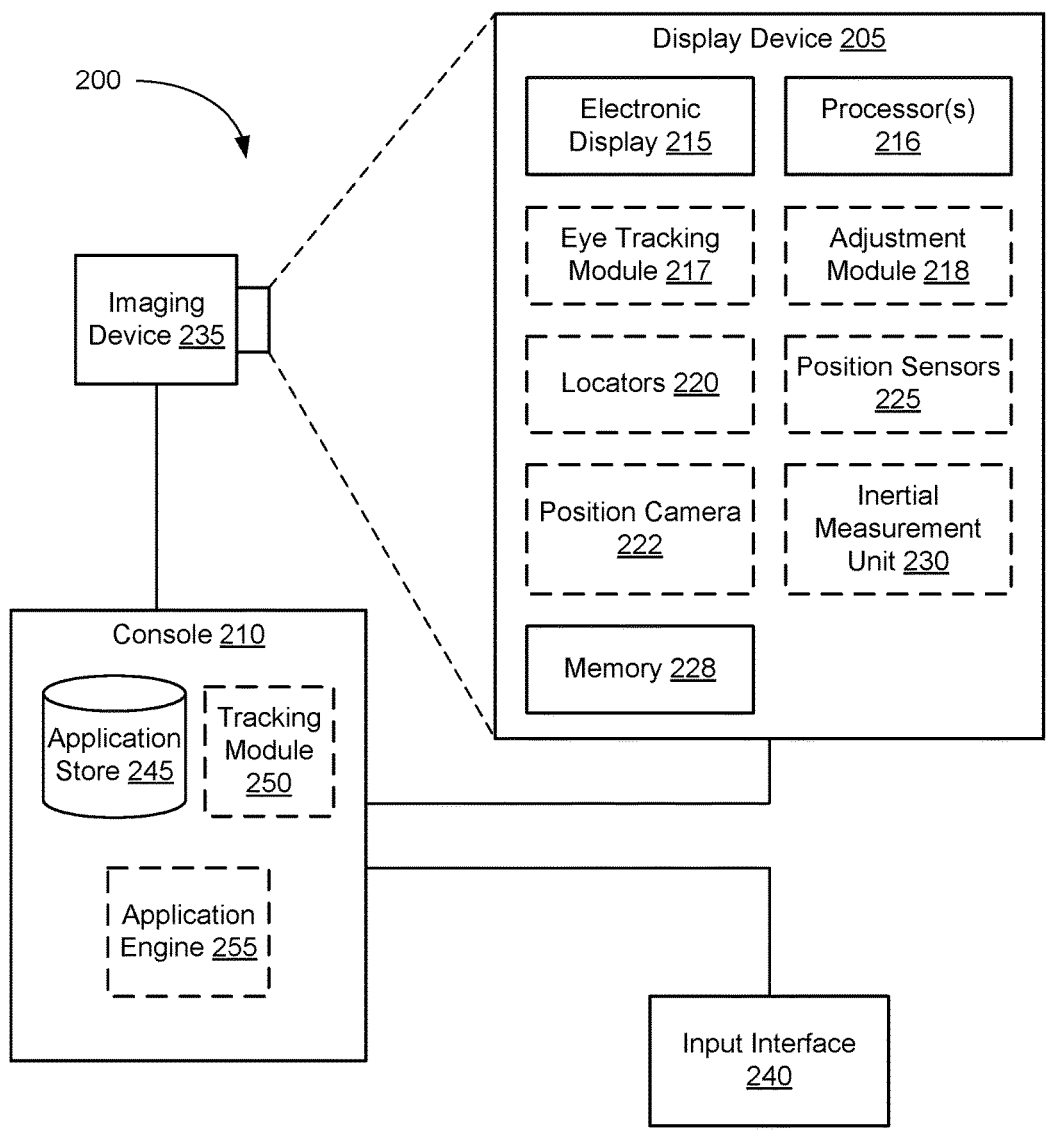
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores the following programs, modules and data structures, or a subset or superset thereof:

instructions for causing locators 220 to emit light;
instructions for causing imaging device 235 to receive light; and
instructions for processing electrical signals from imaging device 235 to determine a position of display device 205.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user). The adjustable electronic display element may be flat, cylindrically curved, or have some other shape.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from their retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image—and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, adjustment module 218 adjusts an output (i.e. the generated image frame) of electronic display 215 based on the detected locations of the pupils. In some embodiments, adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses, or some combination thereof.

In some embodiments, adjustment module 218 is configured to instruct the display elements to not use every pixel (e.g., one or more light emission devices), such that black spaces aperture the diverging light to abut the image together from the retinal perspective. In addition, in some embodiments, gaps are created between the pixel groups to match divergence of the light source array and the magnification of the group of pixels as it transverses through the optical system and fully fills the lenslet. In some embodiments, adjustment module 218 determines, for a given position of an eye, which pixels are turned on and which pixels are turned off—with the resulting image being projected on the eye's retina.

Locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates fast calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates fast calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the fast calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Slow calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, generates content for presentation to the user. Content generated by an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using slow calibration information from imaging device 235. For example, tracking module 250 determines positions of a reference point of display device 205 using observed locators from the slow calibration information and a model of display device 205. In some embodiments, tracking module 250 also determines positions of a reference point of display device 205 using position information from the fast calibration information. Additionally, in some embodiments, tracking module 250 may use portions of the fast calibration information, the slow calibration information, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3A:
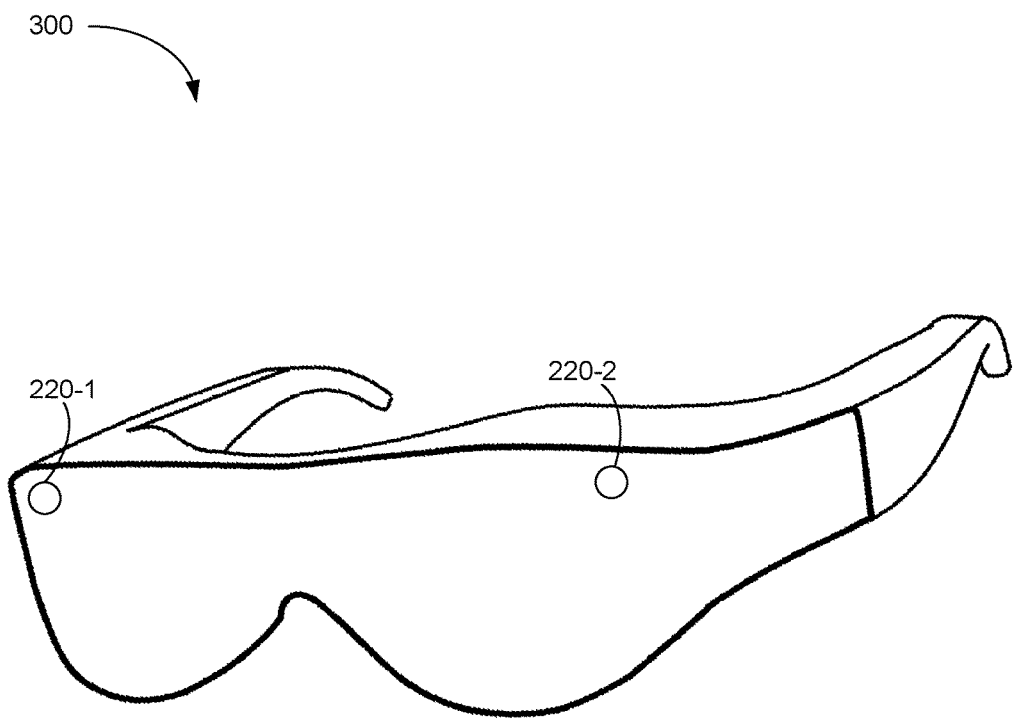
FIGS. 3A-3C are perspective views of a display device with locators in accordance with some embodiments.
Figure 3B:
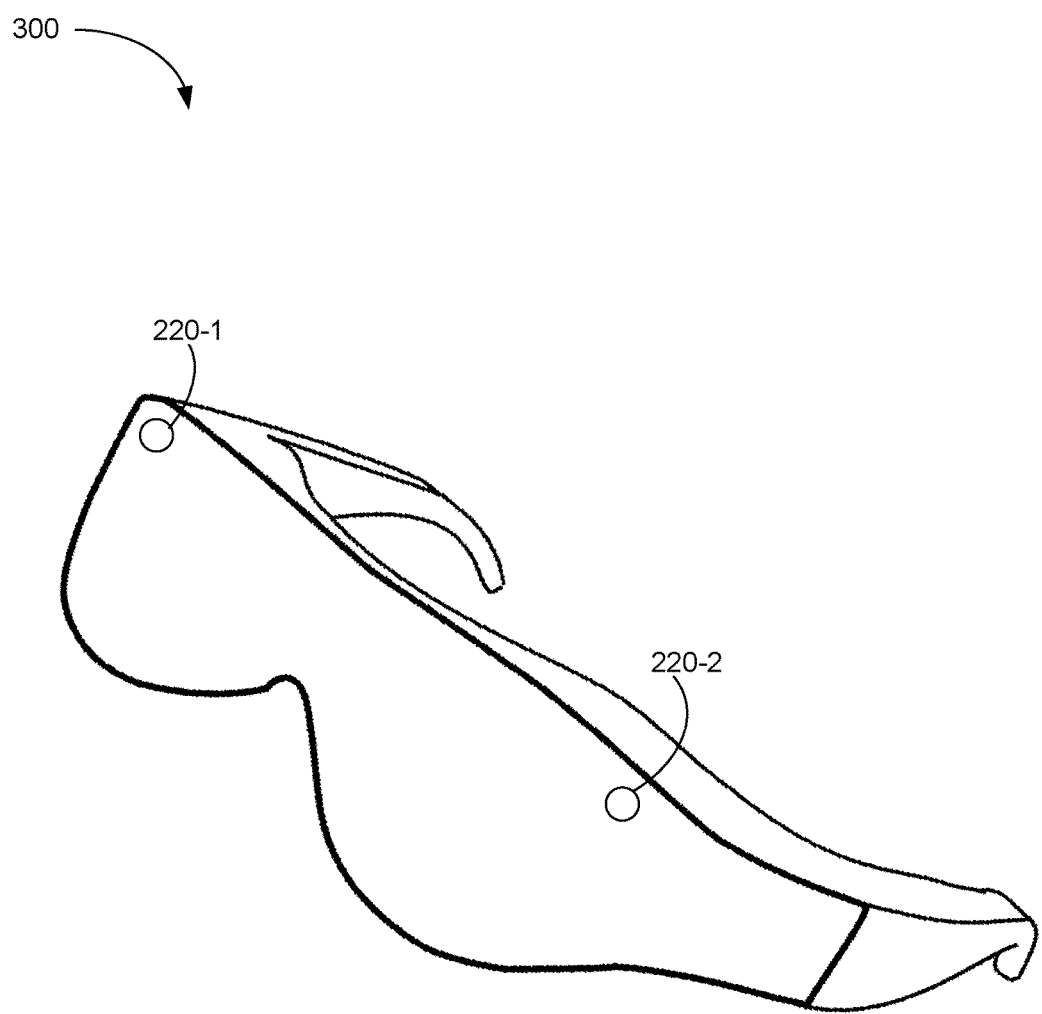
Figure 3C:
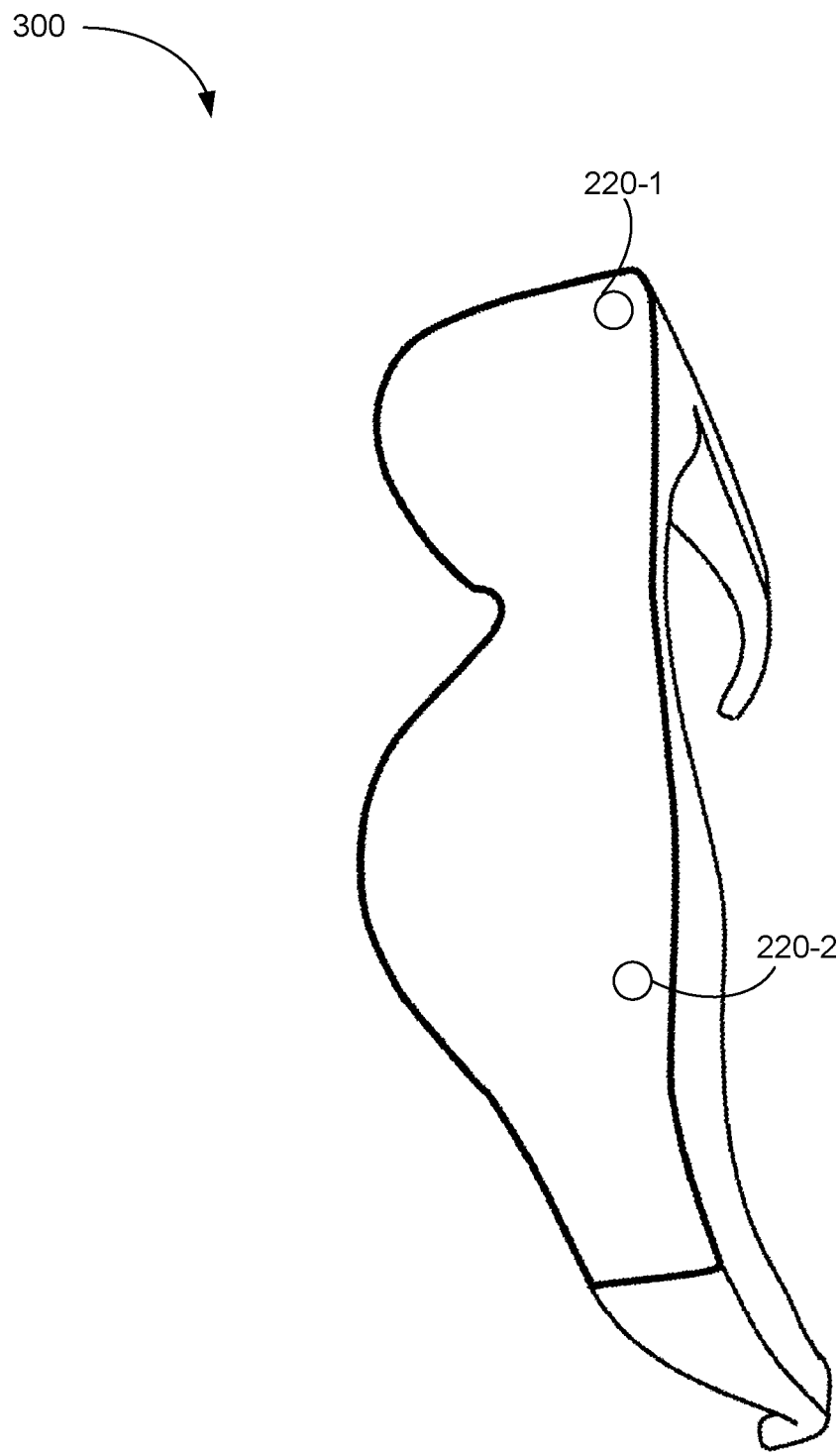

FIGS. 3A-3C are perspective views of a display device with locators in accordance with some embodiments.

FIG. 3A illustrates display device 300, which is similar to display device 100 shown in FIG. 1, except that FIG. 3A shows locators 220-1 and 220-2 (e.g., light sources) on display device 300. Locators 220-1 and 220-2 output light of a same shape (e.g., beams of light from locators 220-1 and 220-2 have the same shape), and a same wavelength profile (e.g., light output by locator 220-1 and light output by locator 220-2 have a same peak wavelength and a same peak width, and thus, they are perceived as having a same color). As explained above with respect to FIG. 2, an image of locators 220-1 and 220-2 collected by imaging device 235 is used to determine a position (e.g., a lateral position and/or an angular position) of display device 300.

For example, in some embodiments, when an image of display device 300 shows that a height of locator 220-1 and a height of locator 220-2 are similar (e.g., locator 220-1 and locator 220-2 are located at similar vertical levels within the image), display device 300 is deemed to be in a horizontal position. In some embodiments, multiple images of display device 300, taken by two or more cameras that are spaced apart, are used to determine the height of locator 220-1 and the height of locator 220-2 (e.g., using triangulation).

FIG. 3B illustrates that display device 300 has rotated. In some embodiments, when an image of display device 300 shows that a height of locator 220-1 is different from a higher of locator 220-2, display device 300 is deemed to be in a tilted position. In some cases, an angle of the tilting can be determined based on the height of locator 220-1 and the height of locator 220-2.

FIG. 3C illustrates that display device 300 has rotated by approximately 90 degrees toward left. Based on the heights of locators 220-1 and 220-2 in an image of display device 300, it can be determined that display device 300 is in a tilted position. However, in the absence of any other information (e.g., a direction of a rotational acceleration on display device 300, a historical angular position information, etc.), it is not easy to determine whether display device 300 is tilted left by 90 degrees or tilted right by 90 degrees based on the heights of locators 220-1 and 220-2 alone, because light from locator 220-1 and light from locator 220-2 cannot be distinguished.

Figure 3D:
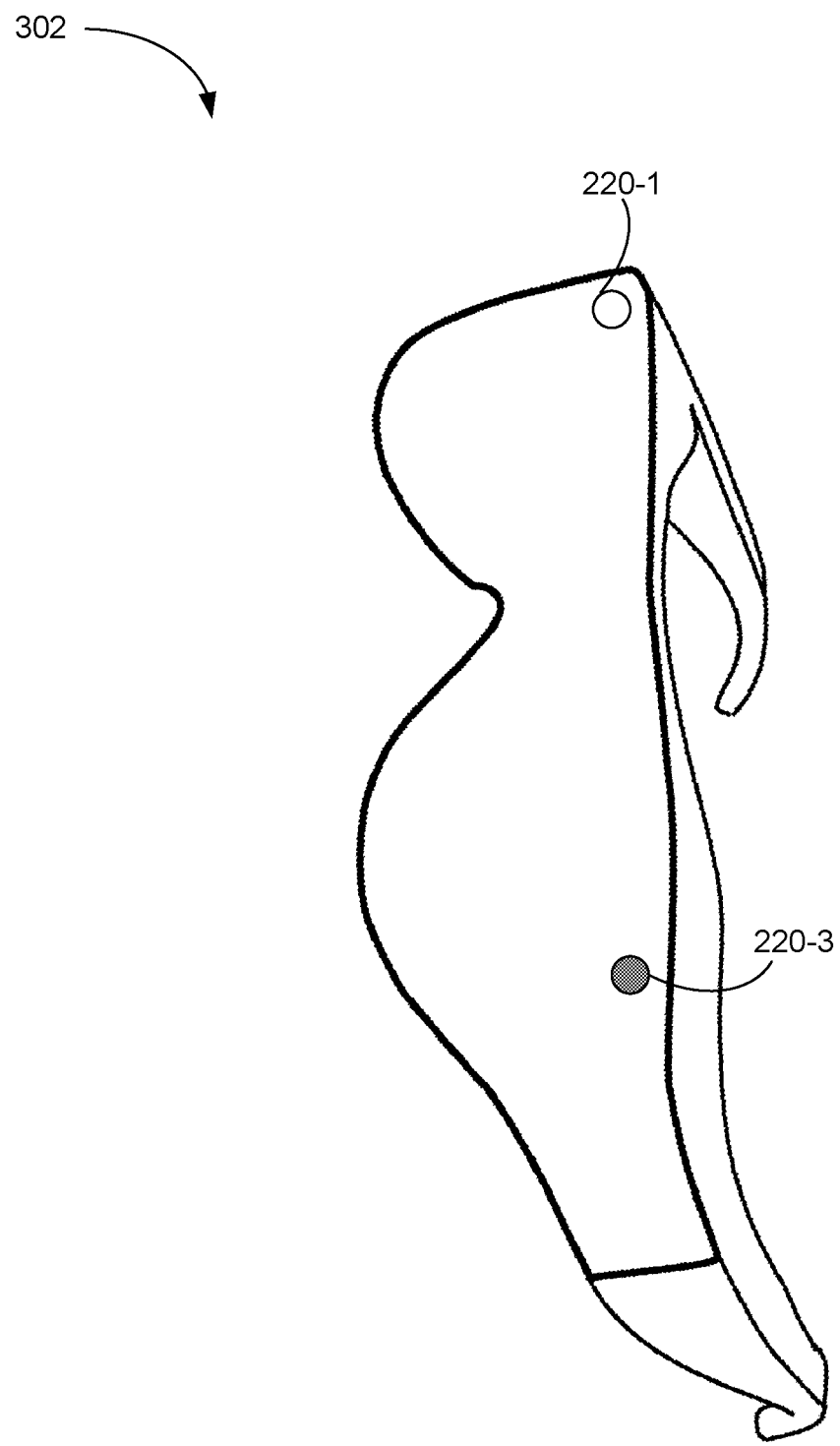
FIG. 3D is a perspective view of a display device with locators in accordance with some embodiments.

FIG. 3D is a perspective view of a display device with locators in accordance with some embodiments. FIG. 3D is similar to FIG. 3C, except that locator 220-3 is used in place of locator 220-2 shown in FIG. 3C. Light output by locator 220-3 has a different wavelength profile than light output by locator 220-1 (e.g., light output by locator 220-3 is red, and light output by locator 220-3 is green). Thus, light output by locator 220-3 and light output by locator 220-1 can be distinguished at least based on their wavelength profiles. As a result, the angular position (or the orientation) of display device 300 can be determined (e.g., when locator 220-1 is located higher than locator 220-3, display device 300 is tilted left, and when locator 220-3 is located higher than locator 220-1, display device 300 is tilted right).

Figure 4A:
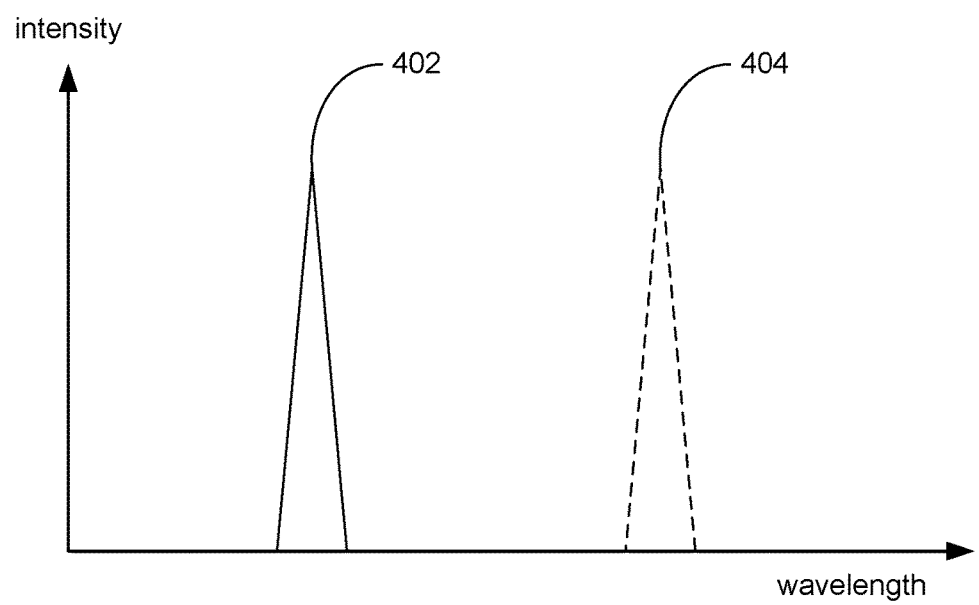
FIGS. 4A and 4B illustrate spectra of light from two different light sources in accordance with some embodiments.
Figure 4B:
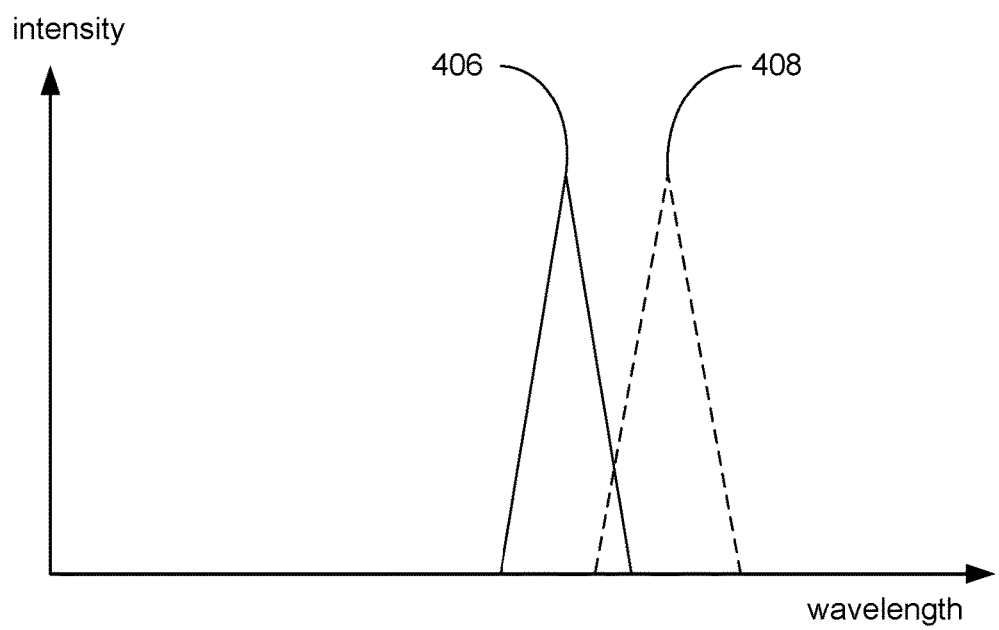

FIGS. 4A and 4B illustrate spectra of light from two different light sources in accordance with some embodiments.

FIG. 4A illustrate a prophetic example of wavelength profile 402 (also called herein a wavelength spectrum) of light output by locator 220-1 (shown in FIG. 3D) and wavelength profile 404 of light output by locator 220-3 (shown in FIG. 3D). As shown in FIG. 4A, wavelength profile 402 of light output by locator 220-1 is separate from wavelength profile 404 of light output by locator 220-2 (e.g., wavelength profile 402 and wavelength profile 404 do not even partially overlap). For example, wavelength profile 402 corresponds to blue light (e.g., 460 nm to 480 nm in wavelength) and wavelength profile 404 corresponds to red light (e.g., 650 nm to 670 nm in wavelength).

FIG. 4B illustrate a different prophetic example of wavelength profile 406 of light output by locator 220-1 and wavelength profile 408 of light output by locator 220-3. In FIG. 4B, wavelength profile 406 and wavelength profile 408 partially overlap, but do not completely overlap so that light from locator 220-1 and light from locator 220-3 can be distinguished. For example, wavelength profile 406 corresponds to deep orange light (e.g., 590 nm to 630 nm) and wavelength profile 408 corresponds to orange-red light (e.g., 620 nm to 660 nm).

FIGS. 5A-5H are schematic diagrams of front views of display devices in accordance with some embodiments.

Figure 5A:
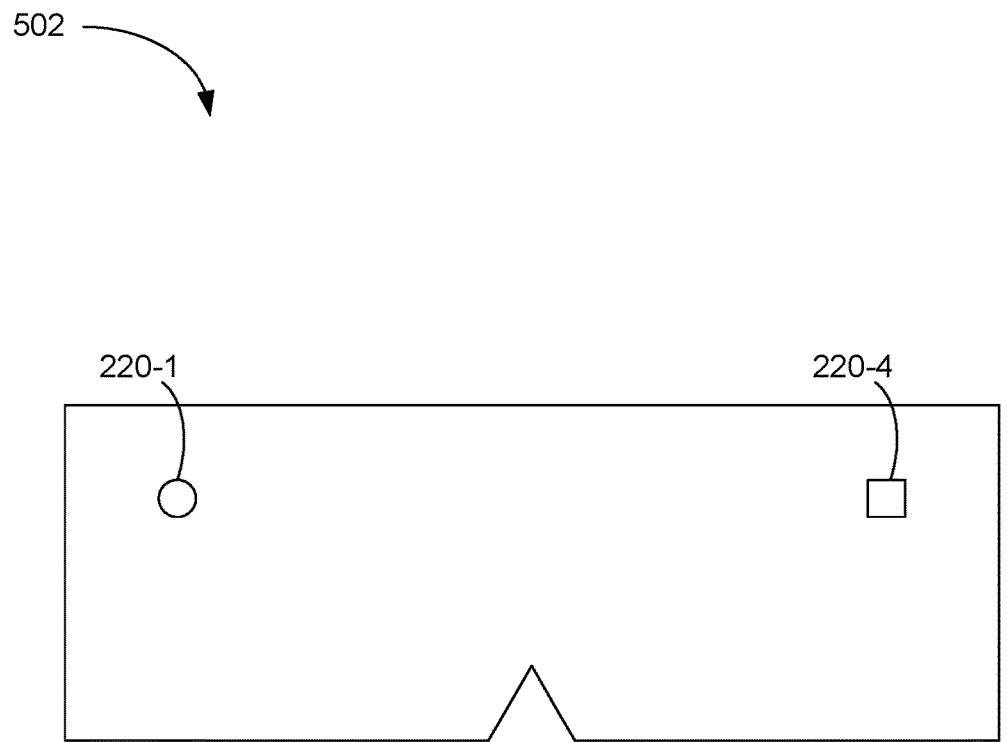
FIGS. 5A-5H are front views of display devices in accordance with some embodiments.

FIG. 5A illustrates display device 502 with locator 220-1 and locator 220-4. Locator 220-1 and locator 220-4 have different shapes (e.g., locator 220-1 has a circular shape and locator 220-4 has a rectangular shape). In some cases, light output by locator 220-1 and light output by locator 220-4 also have different shapes (e.g., light output by locator 220-1 has a circular cross-section and light output by locator 220-4 has a rectangular cross-section). Thus, light output by locator 220-1 and light output by locator 220-4 can be distinguished based on their shapes.

Figure 5B:
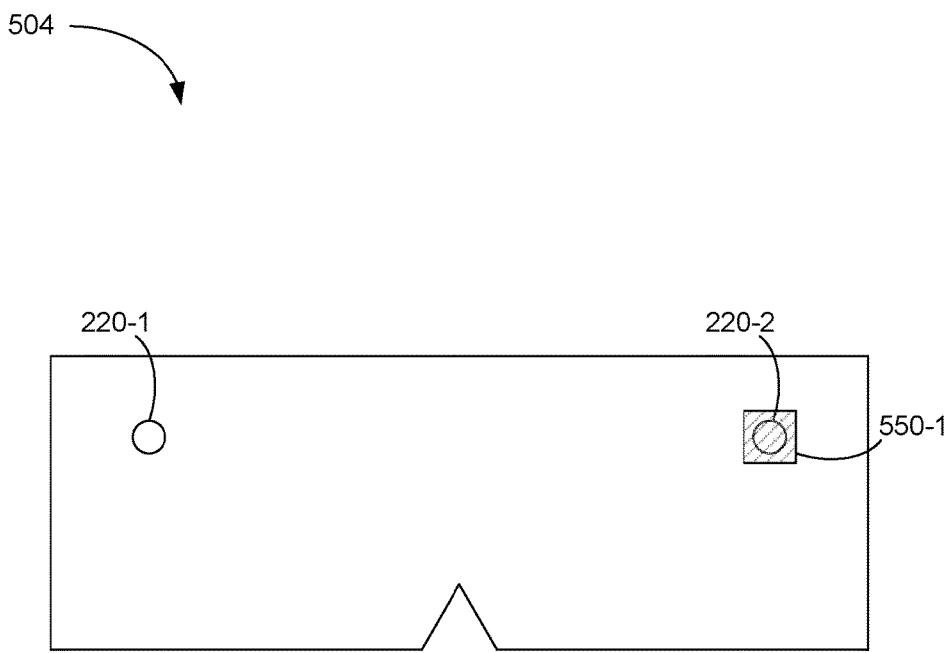

FIG. 5B illustrates display device 504 with locator 220-1 and locator 220-2. Locator 220-1 and locator 220-2 have a same shape (e.g., locator 220-1 and locator 220-2 both have a circular shape). Locator 220-2 is coupled with beam shaper 550-1, which is configured to change a shape of a beam passing therethrough. For example, when light output by locator 220-2 with a circular cross-section passes through beam shaper 550-1, beam shaper 550-1 can cause the light to have a rectangular shape (or any other shape). Exemplary beam shaper 550-1 includes a diffractive optical element and/or a Fresnel lens. In some embodiments, beam shaper 550-1 is a diffractive optical element. In some embodiments, beam shaper 550-1 is a Fresnel lens. Because a shape of the light output by locator 220-2 is modified by beam shaper 550-1, light originating from locator 220-1 and light originating from locator 220-2 can be distinguished based on their shapes (when they reach imaging device 235).

Figure 5C:
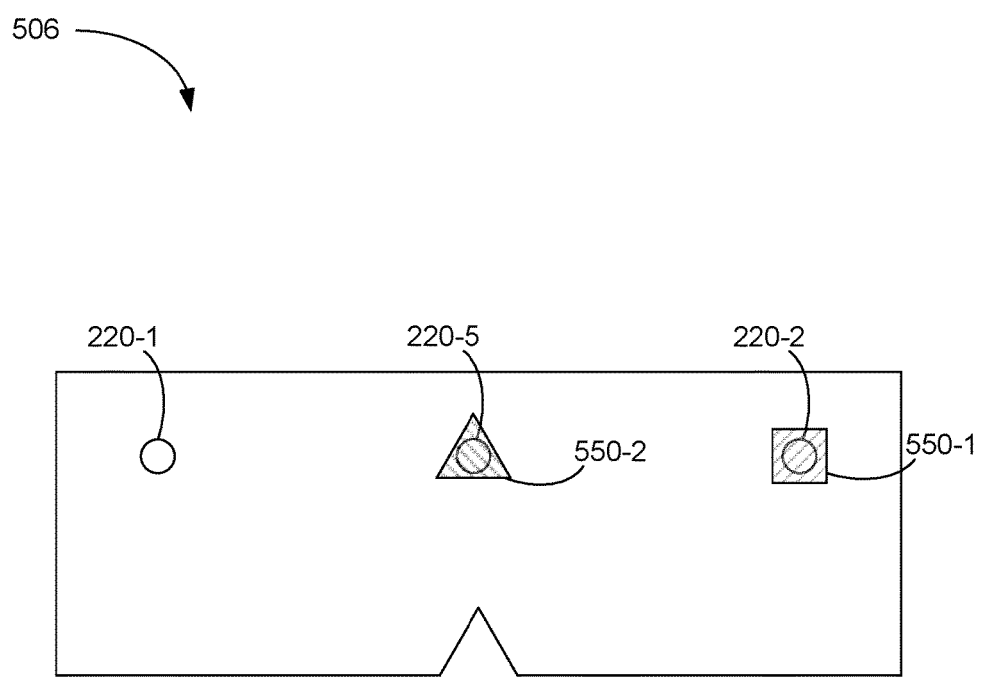

FIG. 5C illustrates display device 506 with locators 220-1, 220-2, and 220-5. Locators 220-1, 220-2, and 220-5 have a same shape (e.g., locators 220-1, 220-2, and 220-5 all have a circular shape). Locator 220-2 is coupled with beam shaper 550-1 and locator 220-5 is coupled with beam shaper 550-2. As described above with respect to locator 220-2, beam shaper 550-1 causes the light from locator 220-2 to have a rectangular shape. Beam shaper 550-2 is configured to cause the light from locator 220-5 to have a triangular shape. Thus, light output by locator 220-1, light output by locator 220-2, and light output by locator 220-5 can be distinguished based on their shapes.

Figure 5D:
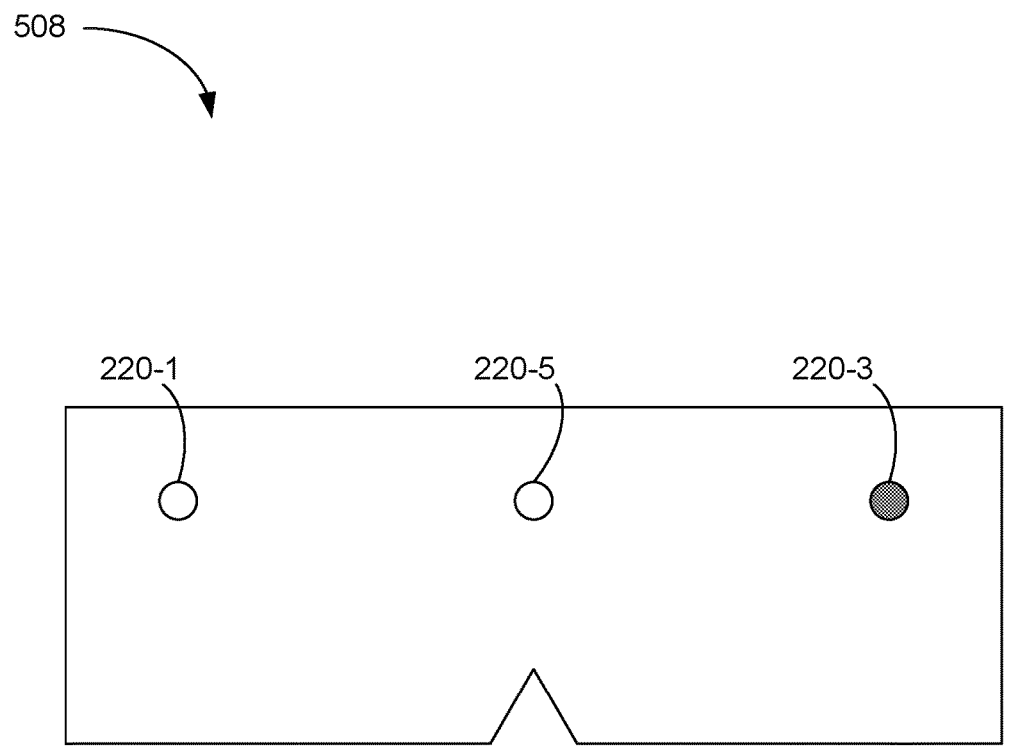

FIG. 5D illustrates display device 508 with locators 220-1, 220-3, and 220-5. Locators 220-1, 220-3, and 220-5 have a same shape (e.g., locators 220-1, 220-3, and 220-5 all have a circular shape). Locators 220-1 and 220-5 output light of a same wavelength profile. Locator 220-3 outputs light of a wavelength profile that is different from a wavelength profile of light output by locator 220-1 (or locator 220-5). Thus, light output by locator 220-3 can be distinguished from light output by locator 220-1 and light output by locator 220-5 based on their wavelength profiles.

Figure 5E:
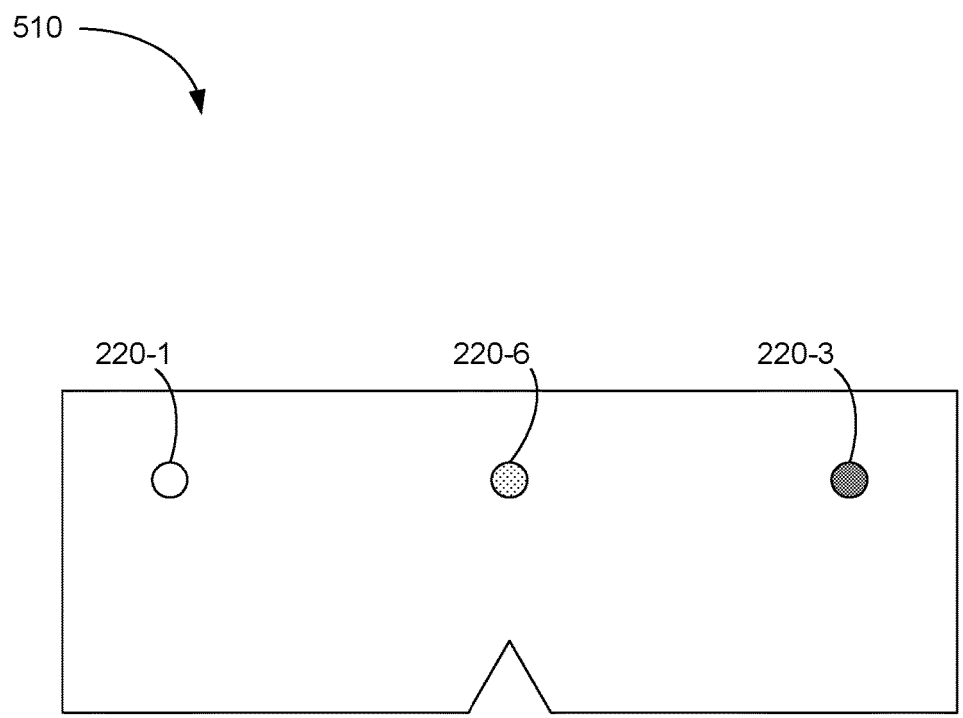

FIG. 5E illustrates display device 510 with locators 220-1, 220-3, and 220-6. Locators 220-1, 220-3, and 220-6 have a same shape (e.g., locators 220-1, 220-3, and 220-5 all have a circular shape). Locator 220-1 and locator 220-3 output light of different wavelength profiles. Locator 220-6 output light of a wavelength profile that is different from wavelength profiles of light output by locators 220-1 and 220-3.

Figure 5F:
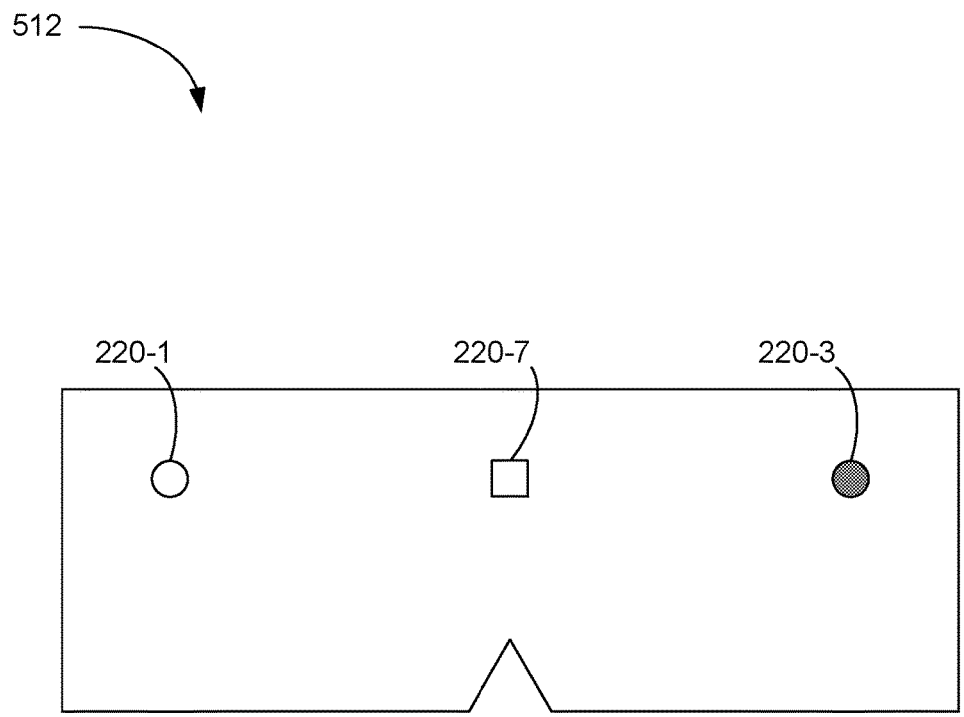

FIG. 5F illustrates display device 512 with locators 220-1, 220-3, and 220-7. Locators 220-1 and 220-3 have a same shape (e.g., locators 220-1 and 220-3 both have a circular shape). Locator 220-7 has a shape that is different from the shape of locator 220-1 (e.g., locator 220-7 has a rectangular shape). Thus, as described above with respect to FIG. 5D, light from locator 220-3 can be distinguished from light from locator 220-1 based on their wavelength profiles. Light from locator 220-7 can be distinguished from light from locator 220-1 based on their shapes.

Figure 5G:
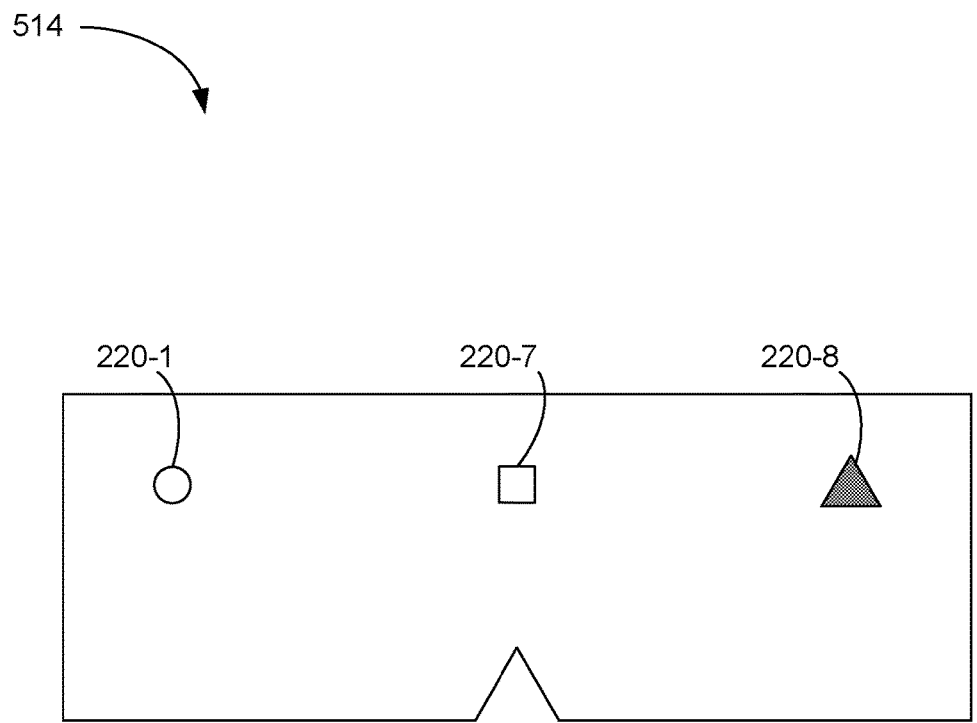

FIG. 5G illustrates display device 514 with locators 220-1, 220-7, and 220-8. Locator 220-8 has a shape that is different from the shape of locator 220-1 and the shape of locator 220-7. In addition, light from locator 220-8 has a wavelength profile that is distinct from a wavelength profile of light from locator 220-1 or locator 220-7. As described above with respect to FIG. 5F, light from locator 220-7 can be distinguished from light from locator 220-1 based on their shapes. In addition, light from locator 220-8 can be distinguished from light from locator 220-1 and light from locator 220-7 based on their shapes and/or wavelength profiles.

Figure 5H:
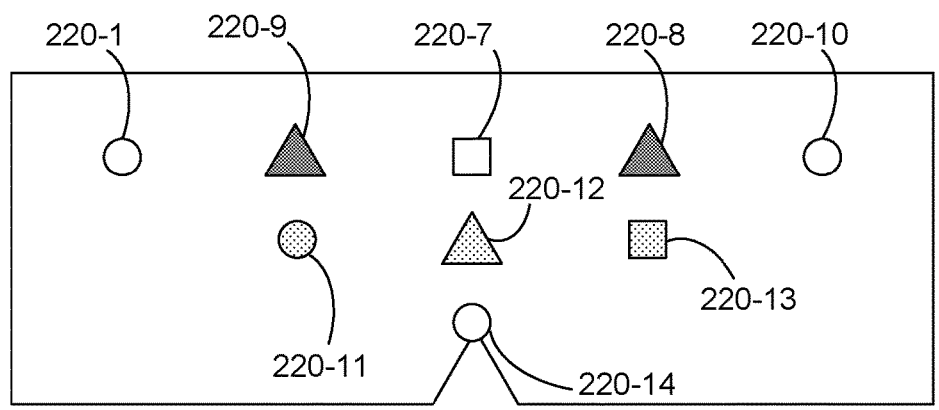

FIG. 5H illustrates display device 516 with locators 220-1 and 220-7 through 220-14 arranged in a predefined pattern (e.g., a triangular pattern is shown in FIG. 5H). Locators 220-1 and 220-7 through 220-14 output light having different shapes and wavelength profiles, which facilitates identification of respective locators. Although some locators may output light of a same shape and a same wavelength profile (e.g., locator 220-8 and locator 220-9 output light of a same triangular shape and a same wavelength profile), based on their locations in the predefined pattern are known (e.g., relative locations between locators 220-8 and 220-9 and/or relative locations of locators 220-8 and 220-9 with respect to the rest of the locators), locators 220-8 and 220-9 can be identified in an image of display device 516.

Therefore, by using light sources (e.g., locators 220) that can be uniquely identified, a position of the display device can be determined. This allows a rapid determination of the position of the display device from an image of the display device. In addition, the image of the display device can be used in conjunction with other position information (e.g., measurements from inertial sensors, etc.) to further improve the speed and/or accuracy in determining the position of the display device.

Certain embodiments based on these principles are described below.

In accordance with some embodiments, a display device includes a two-dimensional array of pixels configured for outputting a respective pattern of light (e.g., display device 304 in FIG. 4A). The two-dimensional array of pixels defines an optical axis (e.g., optical axis 344 in FIG. 4A). The display device also includes an eye tracker. The eye tracker includes a first reflector positioned to intersect the optical axis (e.g., reflector 350 intersects optical axis 344 in FIG. 4A); a first lens that is located off the optical axis (e.g., lens 372 is located off optical axis 344 in FIG. 4A); and an optical sensor configured to collect light, that is from the first reflector and has passed through the first lens, for determining a position of an eye of a user (e.g., in FIG. 4A, optical sensor 380 is configured to collect light from reflector 350 and passing through lens 372).

In accordance with some embodiments, a head-mounted display device includes a display element including a two-dimensional array of pixels (e.g., electronic device 215 in FIG. 2) and an enclosure at least partially enclosing the display element (e.g., a frame of the head-mounted display shown in FIG. 3A). In some embodiments, the enclosure at least partially encloses the display element so that there is an opening through which an eye or both eyes of a user can view the display element and the enclosure reduces ambient light entering the eye or eyes of the user. The display device also includes a plurality of light sources located on the enclosure (e.g., locators 220-1 and 220-3 shown in FIG. 3D) for determining a position of the head-mounted display device. The plurality of light sources is typically located on the external surface of the enclosure so that the plurality of light sources can be detected by an external imaging device (e.g., imaging device 235 in FIG. 2). Each light source of the plurality of light sources is uniquely identifiable based at least in part on light emitted by the light source (e.g., based on a wavelength profile).

In some embodiments, each light source of the plurality of light sources is uniquely identifiable based on a shape and/or a wavelength profile of the light emitted by the light source. For example, in FIG. 5E, locators 220-1, 220-3, and 220-6 can be uniquely identified based on their wavelength profiles. In FIG. 5G, locators 220-1, 220-7, and 220-8 can be uniquely identified based on their shapes (or shapes of light output by locators 220-1, 220-7, and 220-8). In FIG. 5G, locators 220-1, 220-3, and 220-7 can be uniquely identified based on their shapes or wavelength profiles.

In some embodiments, each light source of the plurality of light sources is configured to output light of a respective wavelength. For example, as shown in FIG. 4A, a first light source is configured to emit light of wavelength profile 402 and a second light source is configured to emit light of wavelength profile 404. Wavelength profile 402 and wavelength profile 404 do not overlap at all (e.g., wavelength profile 402 and wavelength profile 404 do not overlap even partially), so the first light source does not emit light of a wavelength within wavelength profile 404 and the second light source does not emit light of a wavelength within wavelength profile 402.

In some embodiments, each light source of the plurality of light sources is configured to output light of a respective wavelength profile. For example, as shown in FIG. 4B, a first light source is configured to emit light of wavelength profile 406 and a second light source is configured to emit light of wavelength profile 408. Wavelength profile 406 and wavelength profile 408 in some cases at least partially overlap as shown in FIG. 4B. In some other cases, two wavelength profiles do not overlap at all.

In some embodiments, each light source of the plurality of light sources is configured to output light of a respective shape (e.g., as shown in FIG. 5A, each locator outputs light of a different shape).

In some embodiments, the display device includes a plurality of diffractive optical elements, each diffractive optical element coupled with a respective light source and configured to modify a shape of the light output by the respective light source (e.g., as shown in FIG. 5C, beam shaper 550-1 modifies a shape of light output by locator 220-2 and beam shaper 550-2 modifies a shape of light output by locator 220-5, where beam shapers 550-1 and 550-2 can be diffractive optical elements).

In some embodiments, the display device includes a plurality of Fresnel lenses, each Fresnel lens coupled with a respective light source and configured to modify a shape of the light output by the respective light source (e.g., in FIG. 5C, Fresnel lenses can be used as shapers 550-1 and 550-2).

In some embodiments, the plurality of light sources is arranged in a structured pattern (e.g., the plurality of light sources is arranged in a predefined spatial pattern, as shown in FIG. 5H).

In some embodiments, the plurality of light sources includes a first light source, a second light source that is distinct and separate from the first light source, and a third light source that is distinct and separate from the first light source and the second light source. The first light source is configured to output light of a first wavelength profile; and the second light source is configured to output light of a second wavelength profile that is distinct from the first wavelength profile. For example, in FIG. 5D, display device 508 includes locators 220-1, 220-3, and 220-5. Locator 220-1 and locator 220-3 are configured to output light of different wavelength profiles (e.g., wavelength profiles shown in FIG. 4B).

In some embodiments, the third light source is configured to output light of the first wavelength profile. For example, in FIG. 5D, locator 220-1 and locator 220-5 are configured to output light of a same wavelength profile.

In some embodiments, the third light source is configured to output light of a third wavelength profile that is distinct from the first wavelength profile and the second wavelength profile. For example, in FIG. 5E, display device 508 includes locators 220-1, 220-3, and 220-6. Locator 220-1 and locator 220-3 are configured to output light of different wavelength profiles. Locator 220-6 is configured to output light of a wavelength profile that is distinct from wavelength profiles of locators 220-1 and 220-3.

In some embodiments, the first light source is configured to output light of a first shape; and the third light source is configured to output light of a second shape that is distinct from the first shape. For example, in FIG. 5F, display device 512 includes locators 220-1, 220-3, and 220-7. Locator 220-1 and locator 220-3 are configured to output light of different wavelength profiles. Locator 220-1 and locator 220-7 are configured to output light of different shapes.

In some embodiments, the second light source is configured to output light of the first shape. For example, in FIG. 5F, locator 220-1 and locator 220-3 are configured to output light of a same shape.

In some embodiments, the second light source is configured to output light of a third shape that is distinct from the first shape and the second shape. For example, in FIG. 5G, display device 514 includes locators 220-1, 220-7, and 220-80. Locator 220-1 and locator 220-8 are configured to output light of different wavelength profiles. Locator 220-1 and locator 220-8 are configured to output light of different shapes. Locators 220-7 is configured to output light of a shape that is distinct from shapes of light output by locators 220-1 and 220-8.

In some embodiments, the head-mounted display device further includes one or more inertial sensors for detecting a movement of the head-mounted display device (e.g., position sensors 225 in FIG. 2).

In accordance with some embodiments, a display device system includes a head-mounted display device, an array of optical sensors for receiving light from the plurality of light sources of the head-mounted display device. The display device system also includes one or more processors for determining the position of the head-mounted display device based at least in part on the received light.

In some embodiments, the array of optical sensors is a camera (e.g., imaging device 235 in FIG. 2).

In accordance with some embodiments, a method is performed at a system including a head-mounted display device (e.g., system 200 in FIG. 2). The method includes receiving light output by a plurality of light sources located on an external surface of the head-mounted display device (e.g., light output by locators 220 on display device 205 is received using imaging device 235 in FIG. 2); generating electrical signals based on the received light (e.g., imaging device 235 converts the received light to electrical signals); and processing the electrical signals to determine a position of the head-mounted display device (e.g., console 210 and/or processor 216 processes the electrical signals).

In some embodiments, the method also includes processing the electrical signals to determine an angular position of the head-mounted display device (e.g., as shown in FIGS. 3A-3C, the angular position of display device 300 is determined based on relative rotation of locators 220-1 and 220-2).

In some embodiments, the method also includes processing the electrical signals to determine a lateral position of the head-mounted display device (e.g., the lateral position of the head-mounted display device is determined based on lateral displacements of locators on the head-mounted display device).

Based on these methods, light sources on the display device can be rapidly identified. Because the positions of the light sources are used to determine the movement of the display device, rapid identification of the light sources facilitates rapid detection of a motion of the display device.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A head-mounted display device, comprising:
   a display element including a two-dimensional array of pixels;
   an enclosure at least partially enclosing the display element; and
   a plurality of light sources located on an external surface of the enclosure, wherein:
      the plurality of light sources is configured for detection by an external imaging device for determining a position of the head-mounted display device;
      each light source of the plurality of light sources is uniquely identifiable based at least in part on light emitted by the light source;
      the plurality of light sources includes a first light source, a second light source that is distinct and separate from the first light source, and a third light source that is distinct and separate from the first light source and the second light source;
      the first light source is configured to output light of a first wavelength profile;
      the second light source is configured to output light of a second wavelength profile that is distinct from the first wavelength profile;
      the first light source is configured to output light of a first shape; and
      the third light source is configured to output light of a second shape that is distinct from the first shape.

2. The head-mounted display device of claim 1, wherein each light source of the plurality of light sources is uniquely identifiable based on a shape and/or a wavelength profile of the light emitted by the light source.

3. The head-mounted display device of claim 1, wherein each light source of the plurality of light sources is configured to output light of a respective wavelength.

4. The head-mounted display device of claim 1, wherein each light source of the plurality of light sources is configured to output light of a respective wavelength profile.

5. The head-mounted display device of claim 1, wherein each light source of the plurality of light sources is configured to output light of a respective shape.

6. The head-mounted display device of claim 5, further including:
   a plurality of diffractive optical elements, each diffractive optical element coupled with a respective light source and configured to modify a shape of the light output by the respective light source.

7. The head-mounted display device of claim 5, further including:
   a plurality of Fresnel lenses, each Fresnel lens coupled with a respective light source and configured to modify a shape of the light output by the respective light source.

8. The head-mounted display device of claim 1, wherein the plurality of light sources is arranged in a structured pattern.

9. The head-mounted display device of claim 1, wherein:
   the third light source is configured to output light of a third wavelength profile that is distinct from the first wavelength profile and the second wavelength profile.

10. The head-mounted display device of claim 1, wherein:
the third light source is configured to output light of the first wavelength profile.

11. The head-mounted display device of claim 1, wherein:
the second light source is configured to output light of the first shape.

12. The head-mounted display device of claim 1, wherein:
the second light source is configured to output light of a third shape that is distinct from the first shape and the second shape.

13. The head-mounted display device of claim 1, further including:
one or more inertial sensors for detecting a movement of the head-mounted display device.

14. A display device system, comprising:
the head-mounted display device of claim 1;
an array of optical sensors for receiving light from the plurality of light sources of the head-mounted display device; and
one or more processors for determining the position of the head-mounted display device based at least in part on the received light.

15. The display device system of claim 14, wherein the array of optical sensors is a camera.

16. A method, comprising:
at a system including a head-mounted display device and an imaging device separate from the head-mounted display device:
receiving light output by a plurality of light sources located on an external surface of the head-mounted display device, wherein:
the plurality of light sources is configured for detection by the imaging device for determining a position of the head-mounted display device;
each light source of the plurality of light sources is uniquely identifiable based at least in part on light emitted by the light source;
the plurality of light sources includes a first light source, a second light source that is distinct and separate from the first light source, and a third light source that is distinct and separate from the first light source and the second light source;
the first light source is configured to output light of a first wavelength profile;
the second light source is configured to output light of a second wavelength profile that is distinct from the first wavelength profile;
the first light source is configured to output light of a first shape; and
the third light source is configured to output light of a second shape that is distinct from the first shape;
generating electrical signals based on the received light; and
processing the electrical signals to determine a position of the head-mounted display device.

17. The method of claim 16, including:
processing the electrical signals to determine an angular position of the head-mounted display device.

18. The method of claim 16, including:
processing the electrical signals to determine a lateral position of the head-mounted display device.

\* \* \* \* \*